United States Patent Office 3,696,086
Patented Oct. 3, 1972

---

3,696,086
PROCESS FOR PREPARING COPOLYMERS OF ETHYLENE AND ALPHA-OLEFINS
Joseph Wagensommer, Westfield, N.J., assignor to Esso Research and Engineering Company
No Drawing. Filed July 28, 1970, Ser. No. 59,038
Int. Cl. C08f 15/40
U.S. Cl. 260—80.78          19 Claims

ABSTRACT OF THE DISCLOSURE

This invention is directed to a novel process for preparing copolymers of ethylene and certain alpha olefins (including terpolymers with dienes) by reaction in the presence of vanadium or titanium catalysts together with aluminum cocatalysts.

BACKGROUND OF THE INVENTION

This invention relates to a process for preparing polymeric compositions. More specifically, it relates to a novel process for producing polymers particularly characterized by their improved properties.

As is well known to those skilled in the art, copolymers of ethylene and higher alpha olefins such as propylene with other polymerizable monomers have been prepared. Typical of these other monomers may be non-conjugated dienes such as 1,4-hexadiene or 5-ethylidene-2-norbornene. It has, however, been found that many prior art polymers so prepared have been characterized by low rates of extrusion and have tensile strengths which have not been as high as desired.

It is an object of this invention to provide a process for preparing a copolymer of ethylene, a higher alpha olefin, and preferably a non-conjugated alkadiene. It is another object of this invention to provide a polymer characterized by improved properties. Other objects will be apparent to those skilled in the art on inspection of the following description.

SUMMARY OF THE INVENTION

In accordance with certain of its aspects, the novel process of this invention for preparing a copolymer of ethylene and a $C_3$ to $C_{10}$ higher alpha olefin may comprise:

(a) Forming a charge mixture of ethylene and a $C_3$ to $C_{10}$ higher alpha olefin;
(b) Forming, in solvent in the absence of cocatalyst, a catalyst mixture consisting essentially of $MX_4$ wherein M is vanadium or titanium, X is halide having an atomic number greater than 9, and $VO(OR)_3$ wherein R is a hydrocarbon moiety, thereby forming a catalyst mixture;
(c) Contacting said charge mixture in a reaction zone with a catalytic amount of (i) said catalyst mixture in said solvent and of (ii) a compound $R'_aAlY_{3-a}$, as cocatalyst, wherein R' is a hydrocarbon moiety, $a$ is an integer 1–3, and Y is a halide having an atomic number greater than 9, thereby forming a copolymer of ethylene and a $C_3$–$C_{10}$ alpha olefin; and
(d) Withdrawing said copolymer as product.

DESCRIPTION OF THE INVENTION

The ethylene used in practice of this invention as first monomer may typically be purified commercially available ethylene of greater than 99.98% purity, typically 99.98% to 99.999%, say 99.99%. It may contain less than 0.02%, typically 0.001% to 0.02%, say 0.01% nonolefinic impurities and less than 0.001%, say 0.0001% to 0.0005% water.

The higher alpha olefin, also called a terminal olefin, which may be used in the practice of this invention as a second monomer, may be a purified commercially available $C_3$ to $C_{10}$ olefin having a purity of greater than 99.98%, typically 99.98% to 99.999%, say 99.99%. It may contain less than 0.02%, say 0.001% to 0.02%, say 0.01% nonolefinic impurities and less than 0.001%, say 0.0001% to 0.0005% water. Nonpolar impurities, such as ethane or other hydrocarbons, may be present, but for best results, polar compounds such as oxygen, water, carbon monoxide, carbon dioxide, etc., may be maintained at or below the indicated low level in the ethylene and alpha olefin field.

The higher alpha olefins having three to ten carbon atoms may be designated by the formula $R'$—$CH=CH_2$ wherein R' is hydrocarbon and typically alkyl including cycloalkyl. Alpha olefins may include typically:

TABLE I

| | |
|---|---|
| propene | 3-ethyl pentene-1 |
| butene-1 | octene-1 |
| pentene-1 | 3-methyl heptene-1 |
| 3-methyl butene-1 | 4-methyl heptene-1 |
| hexene-1 | 5-methyl heptene-1 |
| 3-methyl pentene-1 | 6-methyl heptene-1 |
| 4-methyl pentene-1 | 3-ethyl hexene-1 |
| heptene-1 | 4-ethyl hexene-1 |
| 3-methyl hexene-1 | 3-propyl hexene-1 |
| 4-methyl hexene-1 | decene-1 |
| 5-methyl hexene-1 | |

The preferred higher alpha olefins may be propylene, i.e. propene.

The non-conjugated diolefins which may be third monomer components of the copolymers of this invention may preferably include those having 5–14 carbon atoms. Typical of the non-conjugated diolefins may be the following:

(A) Straight chain acyclic dienes such as: 1,4-hexadiene, 1,6-octadiene.

(B) Branched chain acyclic dienes such as: 5-methyl 1,4-hexadiene; 3,7-dimethyl 1,6-octadiene; 3,7-dimethyl 1,7-octadiene; and the mixed isomers of dihydro-myrcene, and dihydro-ocimene.

(C) Single ring alicyclic dienes such as: 1,4-cyclohexadiene; 1,5-cyclo-octadiene; and 1,5-cyclododecadiene.

(D) Multi-ring alicyclic fused and bridged ring dienes such as: tetrahydroindene; methyltetrahydroindene; dicyclopentadiene; bicyclo (2,2,1) hepta 2,5-diene; alkenyl, alkylidene, cycloalkenyl and cycloalkylidene norbornenes such as 5-methylene-2-norbornene (MNB), 5-ethylidene-2-norbornene (ENB), 5-propenyl-2-norbornene, 5-isopropylidene-2-norbornene, 5-(4-cyclopentenyl)-2-norbornene; 5-cyclohexylidene-2-norbornene.

The preferred third monomer may be 5-ethylidene-2-norbornene (ENB).

Formation of the novel copolymers of this invention may be effected by forming a mixture of the monomer components containing the following components by weight, these being per 100 parts of solvent:

TABLE II

| Component | Broad range | Preferred range | Typical |
|---|---|---|---|
| Ethylene | 0.1–10.0 | 1.0–6.0 | 3.20 |
| Higher alpha olefin | 0.1–20.0 | 1.0–12.0 | 8.50 |
| Diolefin | 0.0–1.0 | 0.0–0.6 | 0.21 |

Mixtures of these monomers may be used, i.e. more than one alpha olefin and/or more than one diolefin may be employed. It will be noted that when only ethylene and higher alpha olefin are present, the product may be a two-component polymer; when the diolefin is present, the copolymer is a terpolymer. Other compatible components, including those which are copolymerizable to form tetrapolymers, may be present.

The monomer mixture may be polymerized (either batchwise or continuously) in the presence of a catalyst composition containing catalyst and cocatalyst. Preferably, the catalyst composition may consist essentially of $MX_4$ wherein M is titanium or vanadium, X is halide having an atomic number greater than 9, and $VO(OR)_3$ wherein R is a hydrocarbon moiety. In the component $MX_4$, X may typically be chlorine, bromine, or iodine, and most preferably chlorine. The preferred composition may be vanadium tetrachloride, $VCl_4$ or titanium tetrachloride, $TiCl_4$.

In the catalyst composition, the compound $VO(OR)_3$ may be one wherein R may be a hydrocarbon moiety, typically alkyl, aryl, alkaryl, and aralkyl. When R is alkyl, it may be methyl, ethyl, propyl, i-propyl, n-butyl, i-butyl, t-butyl, hexyl, cyclohexyl, octyl, etc. When R is aryl, it may be phenyl, naphthyl, etc. When R is alkaryl, it may be tolyl, xylenyl, etc. When R is aralkyl, it may be benzyl, B-phenyl ethyl, etc. The R group may be inertly substituted, i.e. it may bear a substituent which does not react with the other components of the process or interfere with the reaction. Typical inert substituents may include halogen, aryl, alkyl, etc. Typical inertly substituted R radicals may include chlorophenyl, 2-ethyl-hexyl, methylcyclohexyl, etc. All the R groups in a particular compound need not be the same; preferably, however, they may be the same. Preferably, R may be alkyl, and more preferably, lower alkyl having 1 to 10 carbon atoms and, most preferably, butyl.

Preferably, the catalyst mixture may be formed by mixing 0.5 to 5.0, say 1 mole of $MX_4$ with 1 to 10, say 2.0 moles of $VO(OR)_3$. The preferred catalyst composition may consist essentially of 1 mole of vanadium tetrachloride $VCl_4$ and 2 moles of tributyl vanadate $VO(OBu)_3$.

It is a feature of the process of this invention that the catalyst mixture be formed in a hydrocarbon solvent, A. The solvent may be aromatic hydrocarbon or aliphatic hydrocarbon or chlorinated hydrocarbon. Typical aliphatic hydrocarbons may include hexane, heptane, etc. Preferably, the solvent may be an aromatic hydrocarbon solvent such as benzene, including derivatives thereof. Typical illustrative solvents which may be employed may be benzene, toluene, o-xylene, m-xylene, chlorobenzene, p-xylene, ethylbenzene, mesitylene, etc. Commercial mixtures of these aromatic hydrocarbons may be employed. Commercially available aromatic hydrocarbon solvents may be employed, including those sold as benzene, toluene, and xylene and which are substantially free of water and polar compounds.

The preferred hydrocarbon solvent may be benzene, preferably as commercially available having a purity of 95%–99%. It will be apparent to those skilled in the art that the hydrocarbon solvent which may be employed should be substantially free of materials which will react with other compounds in the system, especially water, oxygenated compounds, etc.

In carrying out the process of this invention, the catalyst components may be added to 100 parts of hydrocarbon solvent typically at 10° C. to 80° C., say 20° C. Typically, there may be added 0.1 to 0.4, say 0.25 part of $MX_4$ and 0.2 to 0.8 part, say 0.5 part of $VO(OR)_3$ to form a mixture, and preferably a solution, in hydrocarbon solvent, containing 0.3 to 0.9 part, say 0.75 part total of catalyst mixture.

It is a feature of the novel process of this invention in its preferred aspects that the catalyst mixture consisting essentially of $MX_4$ and $VO(OR)_3$ be formed in the hydrocarbon solvent in the absence of the aluminum cocatalysts used during the polymerization reaction. In practice of the preferred embodiment, the catalyst mixture of (e.g. $VX_4$ and $VO(OR)_3$ will not come into contact with the aluminum cocatalyst prior to the in situ reaction in the reaction zone.

Presence of the aluminum cocatalyst composition in or with the hydrocarbon solvent prior to the addition thereto and reaction therein of the $MX_4$ and the $VO(OR)_3$ components of the catalyst mixture may effectively substantially reduce the activity of the catalyst composition in terms of the number of pounds of product polymer produced per pound of catalyst used if the preferred sequence is not followed. Furthermore, blending of the aluminum cocatalyst with the hydrocarbon solution of the catalyst complex may also significantly reduce the yield of desired product.

It is also a feature of the novel system of this invention that when the $MX_4$ and $VO(OR)_3$ components of the catalyst mixture are added to the hydrocarbon solvent, substantial heat of reaction may be observed, indicating the formation of a new catalytic species by chemical reaction. As is well known to those skilled in the art, evolution of heat of reaction and formation of new catalytic species is not a feature of reported prior art techniques; and it may be the presence of this novel composition which imparts to products and process of this invention at least some of their unusual characteristics.

In accordance with certain of its aspects, this invention is directed to a polymerization catalyst composition comprising a complex $MX_4 \cdot bVO(OR)_3$, wherein M is vanadium or titanium, X is halide having an atomic number greater than 9, $b$ is 0.1–5.0, typically about 2.0, and R is a hydrocarbon moiety, dissolved in hydrocarbon solvent. The complex formed in the presence of hydrocarbon A may be obtained as a complex $MX_4 \cdot bVO(OR)_3 \cdot nA$ in an excess of solvent-complexing agent A. $n$ may typically be a small number 0.5–3.0, and preferably 1. The preferred complexes may be $VCl_4 \cdot VO(OBu)_3 \cdot C_6H_6$;

$VCl_4 \cdot VO(OBu)_3 \cdot C_6H_5CH_3$;  $TiCl_4 \cdot VO(OBu)_3 \cdot C_6H_{14}$ etc.

The aluminum cocatalyst compound which may be used in the practice of the process of this invention may be a compound $R'_a AlY_{3-a}$, wherein R' is a hydrocarbon moiety, $a$ is an integer 1–3, and Y is a halide having an atomic number greater than 9. The hydrocarbon moiety R' may be selected from the same group as that from which hydrocarbon moiety R may be selected. The preferred R' moiety may be ethyl. Preferably $a$ is 2. Y may be a halide, typically chloride, bromide, or iodide and, most preferably, chloride. The preferred aluminum cocatalyst may be diethyl aluminum chloride.

The relative amounts of the catalyst and the cocatalyst in the catalytic mixture used in the process may be such that the molar ratio of aluminum compound to the $MX_4$-vanadate complex may be 0.5–50, preferably 2–20, say 10.

Polymerization may be effected by passing 0.1 to 10, say 3.2 parts of ethylene, 0.1 to 20, say 8.5 parts of alpha olefin, typically propylene, and 0 to 1.0, say 0.21 part of diolefin third monomer, typically 5-ethylidene-2-norbornene, ENB, when employed into 100 parts of liquid inert solvent diluent reaction medium containing catalyst and cocatalyst in catalytic amounts, i.e. 0.0005–0.05, say 0.01 part of catalyst and 0.001–0.20, say 0.05 part of cocatalyst per 100 parts of reaction medium. The non-reactive reaction medium may be an aromatic hydrocarbon such as toluene, a saturated aliphatic hydrocarbon such as heptane, cycloaliphatics such as cyclohexane, or a halohydrocarbon such as tetrachloroethylene. All steps in this reaction should preferably be carried out in the absence of oxygen, moisture, carbon dioxide or other harmful materials. Preferably, all reactants and catalysts may be pure and dry and blanketed with inert gas such as nitrogen or argon.

In the preferred embodiment the nonreactive reaction medium may preferably be the same as the hydrocarbon solvent in which the catalyst mixture has been formed. If not the same material, it will preferably be one which is compatible, e.g. totally miscible with the reaction medium.

In the preferred embodiment, the polymerization reaction may be carried out by separately feeding to the polymerization step the charge mixture of ethylene and higher alpha olefin together with diolefin, when used, the cocatalyst, and the hydrocarbon solvent containing the catalyst. During polymerization, the reaction mixture may be agitated and maintained at temperatures of —40° C. to 200° C., say —10° C. to 100° C., preferably about 30° C. and pressures of 0–1000 p.s.i.g., preferably 0–600 p.s.i.g., say 60 p.s.i.g., during a period of 1–300 minutes, preferably 3–60 minutes, say 15 minutes.

At the end of this period, polymerization may be found to be complete. The catalyst may be deactivated as by addition of an alcohol such as isopropanol or butanol. The mixture may be deashed by mixing with aqueous hydrochloric acid; and the organic layer may be separated and stripped to yield a residue of copolymer. The copolymer may be obtained in an amount of 1–10 parts, say 5 parts corresponding to 90 to 98%, say 94% yield based on ethylene.

The polymer of this invention may contain two components or three components. When it is a two-component copolymer, preferably the ethylene component may be present in amount of 20–85 parts, preferably 50–80 parts, say 70 parts, and the higher alpha olefin, preferably propylene, may be present in amounts of 15–80 parts, preferably 20–50 parts, say 30 parts. When it is a terpolymer, preferably the ethylene component may be present in amounts of 20–85 parts, preferably 50–80 parts, say 70 parts, the higher alpha olefin component may be present in amounts of 15–80 parts, preferably 20–50 parts, say 30 parts, and the third component, typically 5-ethylidene-2-norbornene, may be present in amounts of 0–25 parts, preferably 0.5–15 parts, say 3 parts. Other copolymerized monomers may also be present including butene-1, etc. The product may typically have a number average molecular weight $\overline{M}_n$ of 50,000–200,000 as determined by osmometry.

The tensile strength of the product may be found to be about 5% to 15% above typical comparable prior art values.

It is a particular feature of the product of this invention that it may be formulated and compounded to produce a product unexpectedly characterized by an extrusion rate which may be 5 to 15% greater than the extrusion rate of commercially available comparable products presently known. This is a significant improvement in that it means that product can be extruded at substantially higher rates than has heretofore been possible.

The product may readily be blended with a variety of oils, carbon blacks, clays and silicas. Typical carbon blacks may include those commercially available under the designations SAF, SRF, HAF, FEF, and MPC. The carbon black in amounts of 0–500 or more, preferably 0–200 parts by weight, may be blended with 100 parts of polymer; and 0–200 parts of oil may also be added.

An additional unusual feature of this invention is that the copolymer produced with the novel catalyst may be cured to high tensile strength even in the presence of carbon clack filler having a large particle size. For example, tensile strength in excess of 900 p.s.i. may be obtained when the cured polymer contains 150–300 parts by weight of a coarse carbon black having an average particle size of 0.01–0.5 micron and 50–150 parts of an extender oil.

The novel products of this invention may be used in a wide variety of end uses. Typically, they may find use in molded, formed, or coated products including sponges, tires and inner tubes, footwear, cable coatings, hoses and tubings, belts, etc.

DESCRIPTION OF THE PREFERRED EMBODIMENTS

Practice of this invention may be illustrated by the following examples wherein, as elsewhere in this description, all parts are by weight unless otherwise indicated.

Example 1

In this example, which represents practice of the process of this invention, the catalyst may be prepared by mixing 18.9 parts of titanium tetrachloride (0.1 mole) and 57.2 parts (0.2 mole) of tributyl vanadate in 160 parts of n-hexane to provide a homogeneous catalyst solution containing 33.3 grams of catalyst per 100 ml. catalyst solution. The reaction may be exothermic due to formation of the complex $TiCl_4 \cdot 2VO(O\text{-Butyl})_3 \cdot C_6H_6$; and in this instance it may be found that the temperature of the mixture may rise above room temperature substantially instantaneously.

The polymerization may be carried out by passing to the polymerization reaction vessel per 100 parts of diluent, hexane 3.2 parts of ethylene, 8.5 parts of propylene, 0.21 part of 5-ethylidene-2-norbornene (ENB), 0.0175 part of the catalyst mixture in n-hexane, and 0.0362 part of diethyl aluminum chloride cocatalyst in a 4.4% (wt.) solution in hexane.

Reaction may be conducted at 27° C. and 60 p.s.i.g. for an effective residence time of 13.5 minutes during which the reactants may be subjected to agitation. All reactants and vessels may be maintained pure, dry and anaerobic.

At the conclusion of a polymerization run, the products may be removed from the reaction vessel and the catalyst deactivated by addition of 0.5 part of isopropanol. The reaction mixture may be mixed with dilute hydrochloric acid and the hydrocarbon layer separated. Solvent may be stripped at 100° C. to yield product polymer.

The product may be analyzed and the analyses are set forth in Table III together with other significant process conditions.

The specific process conditions set forth in the various tables may include the following:

(1) Al/(V+Ti)—The molar ratio of the aluminum cocatlyst to the sum of the moles of the vanadium catalyst and the titanium catalyst.

(2) Rate—The rate of polymerization in grams per hour was also determined.

(3) Efficiency—The catalyst efficiency was determined in terms of pounds of polymer produced per pound of $VO(OR)_3$ present in the catalyst.

(4) Conversion—The percent of ethylene and separately the percent of propylene admitted to the reaction vessel, which was converted to polymer product, was measured.

(5) $C_2$ Comp.—The weight percent of ethylene in the polymer composition was measured by infrared spectroscopy.

(6) I.V.—The inherent viscosity of the polymer product was determined in decalin at 135° C. by standard methods.

(7) $M_L$—The Mooney Viscosity at 260° F. was determined using a large #1 rotor for 8 minutes.

In Table III which follows, the results of Example 1 are set forth. In Examples 2–3, the same conditions as used in Exaample 1 were followed except where, as shown, the propylene feed or the catalyst quantity or the Al/V+Ti ratio was changed. In Examples 1-3, the runs were carried out in a three-gallon reactor using as catalyst $TiCl_4 \cdot 2VO(OBu)_3$. In Examples 4-6, the runs were carried out in a two-gallon reactor. This accounts for the difference in the determined rate. The catalyst in Examples 4-5 was $TiCl_4 \cdot 2VO(OEt)_3$. The catalyst of Example 6 was $TiCl_4 \cdot VO(OBu)_3$. In run 6, the ratio of vanadium to titanium was changed, as will be discussed hereafter. All reactions were carried out at 27° C. The residence time in all cases was about 13.5 minutes.

TABLE VI

|  | Control | Example 1 | Example 2 | Example 3 |
|---|---|---|---|---|
| $M_L$ | 63 | 51 | 52 | 48 |
| Wt. percent $C_2$ | 58.4 | 61.8 | 61.9 | 61.4 |
| Wt. percent ENB | 3 | 3 | 3 | 3 |
| Physical properties: |  |  |  |  |
| Tensile, p.s.i. | 1,730 | 1,870 | 1,800 | 1,800 |
| Elongation, percent | 690 | 670 | 750 | 770 |
| 300% modulus | 600 | 630 | 510 | 480 |
| Garvey extrusion, inches/min | 66 | 63 | 58 | 58 |

TABLE III

| Example Number | Feed, lb./100 lbs. diluent solvent |  |  |  | Al (V+Ti) | Catalyst type |  | Molar ratio |
|---|---|---|---|---|---|---|---|---|
|  | Ethylene | Propylene | ENB | Catalyst |  |  |  |  |
| 1 | 3.20 | 8.50 | .21 | .0175 | 4.3 | 1 | $VO(O-Bu)_3$ | 2/1 |
| 2 | 3.20 | 8.90 | .21 | .0186 | 4.1 | 2 |  |  |
| 3 | 3.20 | 9.83 | .21 | .0197 | 4.1 | 3 |  |  |
| 4 | 3.00 | 9.25 | .22 | .0213 | 4.2 | 4 | $VO(O-Et)_3$ | 2/1 |
| 5 | 3.00 | 10.25 | .22 | .0213 | 4.2 | 5 |  |  |
| 6 | 3.20 | 9.50 | .23 | .0212 | 4.7 | 6 | $VO(O-Bu)_3$ | 1/1 |

The results obtained from the calculations and analyses are set forth in Table IV.

TABLE IV

| Example No. | Rate | Efficiency | Conversion $C_2$ | Conversion $C_3$ | $C_2$ polymer composition | I.V. | $M_L$ |
|---|---|---|---|---|---|---|---|
| 1 | 1,460 | 367 | 94 | 22 | 61.8 | 3.3 | 51 |
| 2 | 1,510 | 358 | 97 | 22 | 61.9 | 3.5 | 52 |
| 3 | 1,475 | 330 | 94 | 19 | 61.4 | 3.5 | 48 |
| 4 | 936 | 322 | 97 | 18 | 62.3 | 4.0 | 56 |
| 5 | 948 | 327 | 94 | 18 | 59.7 | 3.8 | 53 |
| 6 | 963 | 371 | 92 | 20 | 60.8 | 3.4 | 47 |

From Examples 1-6 as tabulated in Tables III and IV, it will be apparent that over the various conditions under which the examples were carried out and at the varying ratios of aluminum to vanadium and titanium, the rate of copolymerization was high. It ranged from a minimum of 936 grams of copolymer produced per hour at the lowest up to, in these illustrative examples, 1510 grams per hour. Furthermore, as will be noted from column 3 of Table IV, the catalyst efficiency may uniformly be at the 320-370 pound per pound level. It will also be noted from Table IV that unusually high conversion yields of ethylene may be obtained.

The products of Examples 1, 2 and 3, which are typical of the polymer compositions prepared in accordance with the process of this invention, were each separately compounded by e.g. mixing with the following formulations:

TABLE V

| | Parts |
|---|---|
| Polymer | 100 |
| FEF carbon black | 70 |
| SRF carbon black | 30 |
| Flexon 886 blend of extender oil | 120 |
| Stearic acid | 1 |
| Zinc oxide | 5 |
| TMTDS (tetramethyl thiuram disulfide) | 0.5 |
| DPTTS | 0.5 |
| TDEDC | 0.5 |
| MBT (mercaptobenzothiazole) | 0.5 |
| Sulfur | 0.85 |

The so-mixed formulation may be blended in a Banbury mixer, then cured for 20 minutes at 320° F. and tested in standard manner. The products of this invention, when tested against a commercial brand of ethylene-propylene copolymer (a comparable brand presently marketed) as a control, may be found to possess the properties set forth in Table VI as follows:

The products of Exampes 4-6 were compounded by mixing with the formulations of Table VII.

TABLE VII

| | Parts |
|---|---|
| Polymer | 100 |
| FEF carbon black | 100 |
| Flexon 886 blend of extender oil | 120 |
| Stearic acid | 1 |
| Zinc oxide | 5 |
| TMTDS (tetramethyl thiuram disulfide) | 3 |
| MBT (mercaptobenzothiazole) | 0.5 |
| Sulfur | 1.5 |

The so-mixed formulation may be blended in a Banbury mixer and then cured for 20 minutes at 320° F. and tested in standard manner. The products of this invention, when tested against a commercial brand of ethylene-propylene copolymer (a comparable brand presently marketed) as a control, may be found to possess the properties set forth in Table VIII as follows:

TABLE VIII

|  | Control | Example 4 | Example 5 | Example 6 |
|---|---|---|---|---|
| $M_L$ | 60 | 56 | 53 | 47 |
| Wt. percent $C_2$ | 60 | 62.3 | 59.7 | 60.8 |
| ENB | 3 | 3 | 3 | 3 |
| V/Ti molar ratio |  | 2 | 2 | 1 |
| Physical properties: |  |  |  |  |
| Tensile, p.s.i. | 1,840 | 2,040 | 1,920 | 1,900 |
| Elongation, percent | 480 | 500 | 500 | 480 |
| 300% modulus | 1,030 | 1,120 | 1,000 | 1,070 |
| Garvey extrusion, inches/min | 73 | 80 | 82 | 82 |

From Table VI it will be apparent (comparing the control prior art with Examples 1-3 carried out in accordance with the instant invention) that the products are comparable products in that they have essentially the same percent ethylene. However, inspection of the measured physical properties clearly reveals that the tensile strength of applicant's novel product may be 5% to 10% higher than that of the control prior art product. Similarly, the elongation of applicant's novel product may be as much as 10% greater than that of the control prior art product. More unexpectedly, however, is the fact that it is possible to simultaneously increase both the tensile strength and the percent elongation. Prior attempts to increase one of these properties normaly results in a decrease in the other.

Inspection of Taable VIII also reveals that using the novel technique of the instant invention, it is possible to achieve satisfactory results including increased tensile strength and increased extrusion rates.

Results comparable to the above may be obtained by using other catalyst systems falling within the scope of this invention, for example:

(a)
vanadium tetrachloride
tributyl vanadate
toluene (b)
titanium tetrachloride
triethyl vanadate
dichlorobenzene (c)
vanadium tetrabromide
tributyl vanadate
chloroform (d)
titanium tetrachloride
tri-isopropyl vanadate
xylene Although this invention has been illustrated by reference to specific embodiments, it will be apparent to those skilled in the art that various changes and modifications may be made which clearly fall within the scope of this invention.

What is claimed is:

1. The process of preparing a copolymer of ethylene and a $C_3$ to $C_{10}$ higher alpha olefin which comprises:
   (a) forming a charge mixture of ethylene and a $C_3$ to $C_{10}$ higher alpha olefin;
   (b) forming, in a hydrocarbon solvent, A, in the absence of monomers and cocatalyst, a catalyst mixture consisting essentially of from 0.5 to 5.0 moles of $MX_4$ wherein M is vanadium or titanium and X is halide having an atomic number greater than 9, and from 1 to 10 moles of $VO(OR)_3$ wherein R is a $C_1$ to $C_{10}$ alkyl hydrocarbon moiety, thereby forming a catalyst component having the formula $$MX_4 \cdot bVO(OR)_3 \cdot nA$$

where $b$ is 0.1–5.0 and $n$ is 0.5–3.0;
   (c) contacting said charge mixture in a reaction zone with a catalytic amount of (i) said catalyst component in said solvent and of (ii) as cocatalyst, a compound $R'_a AlY_{3-a}$ wherein R' is a $C_1$ to $C_{10}$ alkyl hydrocarbon moiety, $a$ is an integer 1–3, and Y is a halide having an atomic number greater than 9, the molar ratio of said Al compound to said catalyst component being from 0.5 to 50, thereby forming a copolymer of ethylene and a $C_3$–$C_{10}$ alpha olefin, at a temperature of from −40° C. up to 200° C.; and
   (d) withdrawing said copolymer as product.

2. The process claimed in claim 1 wherein said solvent is an aromatic or cycloaliphatic hydrocarbon solvent.

3. The process claimed in claim 1 wherein said $MX_4$ is vanadium tetrachloride.

4. The process claimed in claim 1 wherein said $MX_4$ is titanium tetrachloride.

5. The process claimed in claim 1 wherein said $VO(OR)_3$ is tri-alkyl vanadate.

6. The process claimed in claim 1 wherein said cocatalyst is diethyl aluminum chloride.

7. The process of preparing a copolymer of ethylene and a $C_3$ to $C_{10}$ higher alpha olefin which comprises:
   (a) forming a charge mixture of ethylene and a $C_3$ to $C_{10}$ higher alpha olefin;
   (b) forming, in hydrocarbon, A, solvent in the absence of monomers and cocatalyst, a catalyst mixture consisting essentially of from 0.5 to 5 moles of vanadium tetrachloride and from 1 to 10 moles of tributyl vanadate thereby forming a catalyst component, having the formula $$VCl_4 \cdot bVO(O\text{-butyl})_3 \cdot nA$$

where $b$ is 0.1–5.0 and $n$ is 0.5–3.0;
   (c) contacting said charge mixture in a reaction zone with a catalytic amount of (i) said catalyst component in said hydrocarbon solvent and of (ii) as cocatalyst, a compound $R'_a AlY_{3-a}$ wherein R' is a $C_1$ to $C_{10}$ alkyl hydrocarbon moiety, $a$ is an integer 1–3, and Y is a halide having an atomic number greater than 9, the molar ratio of Al compound to catalyst component being from 2–20 thereby forming a copolymer of ethylene and a $C_3$–$C_{10}$ alpha olefin, at a temperature of from −40° to about 200° C.; and
   (d) withdrawing said copolymer as product.

8. The process of preparing a copolymer of ethylene and a $C_3$ to $C_{10}$ higher alpha olefin which comprises:
   (a) forming a charge mixture of ethylene and a $C_3$ to $C_{10}$ higher alpha olefin;
   (b) forming, in hydrocarbon solvent, A, in the absence of monomers and cocatalyst, a catalyst component consisting essentially of from 0.5 to 5 moles of titanium tetrachloride and from 1 to 10 moles of tri-butyl vanadate having the formula $$TiCl_4 \cdot bVO(O\text{-butyl})_3 \cdot nA$$

where $b$ is 0.1–5.0 and $n$ is 0.5–3.0;
   (c) contacting said charge mixture in a reaction zone with a catalytic amount of (i) said catalyst component in said hydrocarbon solvent and of (ii) as cocatalyst, a compound $R'_a AlY_{3-a}$ wherein R' is a $C_1$–$C_{10}$ alkyl hydrocarbon moiety, $a$ is an integer 1–3, and Y is a halide having an atomic number greater than 9, the molar ratio of aluminum compound to titanium-vanadate component being from 2–20 thereby forming a copolymer of ethylene and a $C_3$–$C_{10}$ alpha olefin at a temperature of from about −10 to 100° C.; and
   (d) withdrawing said copolymer as product.

9. The process of preparing a copolymer of ethylene and a $C_3$ to $C_{10}$ higher alpha olefin as claimed in claim 1, wherein said catalyst component in said hydrocarbon solvent is added to said reaction zone separately from said cocatalyst.

10. The process of preparing a copolymer of ethylene and a $C_3$ to $C_{10}$ higher alpha olefin as claimed in claim 1, wherein said catalyst component in said hydrocarbon solvent is added to said reaction zone separately from said cocatalyst and with said ethylene and said $C_3$ to $C_{10}$ higher alpha olefin.

11. The process of preparing a copolymer of ethylene, a $C_3$ to $C_{10}$ higher alpha olefin, and a nonconjugated diolefin which comprises:
   (a) forming a charge mixture of ethylene, a $C_3$ to $C_{10}$ higher alpha olefin and a nonconjugated diolefin;
   (b) forming, in benzene in the absence of monomers and cocatalyst, a catalyst component consisting essentially of vanadium tetrachloride and tri-butyl vanadate having the formula $VCl_4 \cdot bVO(O\text{-butyl})_3 \cdot n$ benzene, where $b$ is 0.1–5.0 and $n$ is 0.5 to 3.0;
   (c) contacting said charge mixture in a reaction zone with a catalytic amount of (i) said catalyst component in benzene and of (ii) diethyl aluminum chloride as cocatalyst, where the molar ratio of Al compound to catalyst component is 2–20 thereby forming a terpolymer of ethylene, $C_3$–$C_{10}$ alpha olefin, and a nonconjugated diolefin; and
   (d) withdrawing said terpolymer as product.

12. The process of preparing a copolymer of ethylene, a $C_3$ to $C_{10}$ higher alpha olefin; and a nonconjugated diolefin which comprises:
   (a) forming a charge mixture of ethylene, a $C_3$ to $C_{10}$ higher alpha olefin and a non-conjugated diolefin;
   (b) forming, in benzene in the absence of monomers and cocatalyst, a catalyst component consisting essentially of titanium tetrachloride and tri-butyl vanadate having the formula TiCl$_4 \cdot b$VO(O-butyl)$_3 \cdot n$ benzene where $b$ is 0.1–5.0 and $n$ is 0.5 to 3.0;

(c) contacting said charge mixture in a reaction zone with a catalytic amount of (i) said catalyst component in benzene and of (ii) diethyl aluminum chloride as cocatalyst where molar ratio of Al compound to catalyst component is 2 to 20 thereby forming a terpolymer of ethylene, a $C_3$–$C_{10}$ alpha olefin, and a nonconjugated diolefin; and (d) withdrawing said terpolymer as product.

13. A catalyst component consisting essentially of MX$_4$ and VO(OR)$_3$ in hydrocarbon, A, wherein M is titanium or vanadium, X is halide having an atomic number greater than 9 and R is a $C_1$–$C_{10}$ alkyl hydrocarbon moiety, wherein said component has the formula MX$_4 \cdot b$VO(OR)$_3 \cdot n$A, where $b$ is 0.1–5.0 and $n$ is 0.5 to 3.0.

14. A catalyst component as claimed in claim 13 consisting essentially of vanadium tetrachloride and trialkyl vanadate in a hydrocarbon solvent.

15. A catalyst component as claimed in claim 10 consisting essentially of titanium tetrachloride and trialkyl vanadate in benzene.

16. A catalyst component comprising

MX$_4 \cdot b$VO(OR)$_3 \cdot n$A wherein M is vanadium or titanium, X is a halide having an atomic number greater than 9, R is a $C_1$ to $C_{10}$ alkyl hydrocarbon moiety, $b$ is 0.1–5.0, $n$ is 0.5–3.0, and A is an aromatic or cycloaliphatic hydrocarbon.

17. A catalyst component comprising a solution, in an excess of hydrocarbon solvent A, of MX$_4 \cdot b$VO(OR)$_3 \cdot n$A wherein M is vanadium or titanium, X is a halide having an atomic number greater than 9, R is a $C_1$ to $C_{10}$ alkyl hydrocarbon moiety, $b$ is 0.1 to 5.0, $n$ is 0.5–3.0, and A is an aromatic or cycloaliphatic hydrocarbon.

18. A catalyst component comprising, in solution in an excess of benzene, VCl$_4 \cdot$2VO(OR)$_3 \cdot$C$_6$H$_6$ wherein R is a $C_1$ to $C_{10}$ alkyl hydrocarbon.

19. A catalyst component comprising, in solution in an excess of benzene, TiCl$_4 \cdot$2VO(OR)$_3 \cdot$C$_6$H$_6$ wherein R is a $C_1$ to $C_{10}$ alkyl hydrocarbon.

References Cited
UNITED STATES PATENTS

| | | | |
|---|---|---|---|
| 3,218,266 | 11/1965 | Ludlum | 252—429 |
| 3,308,112 | 3/1967 | Ludlum | 260—94.9 |
| 3,328,381 | 6/1967 | Borman | 260—94.9 |
| 3,567,653 | 3/1971 | Wagensommer et al. | 252—429 |

JOSEPH L. SCHOFER, Primary Examiner

R. S. BENJAMIN, Assistant Examiner

U.S. Cl. X.R.

260—88.2 R; 252—429 C